March 23, 1948. J. W. KINNEAR, JR 2,438,405
METHOD FOR MANUFACTURING BIMETALLIC BODIES
Filed May 14, 1946
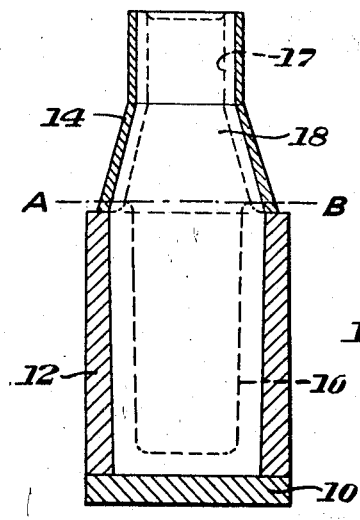
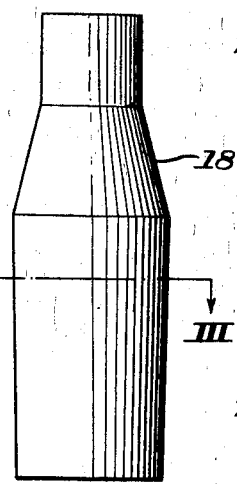
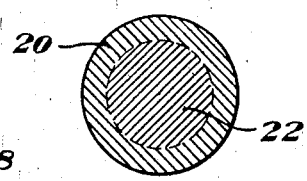
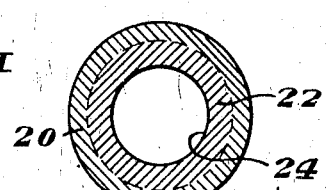
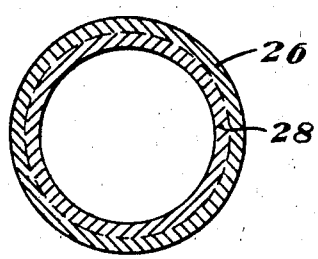
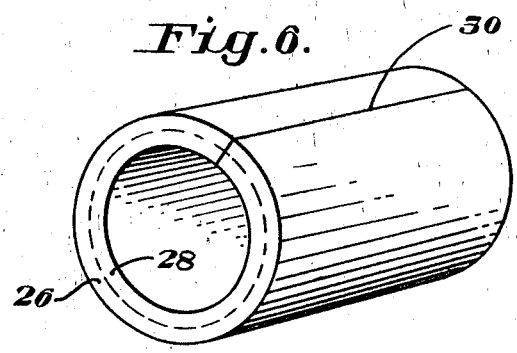
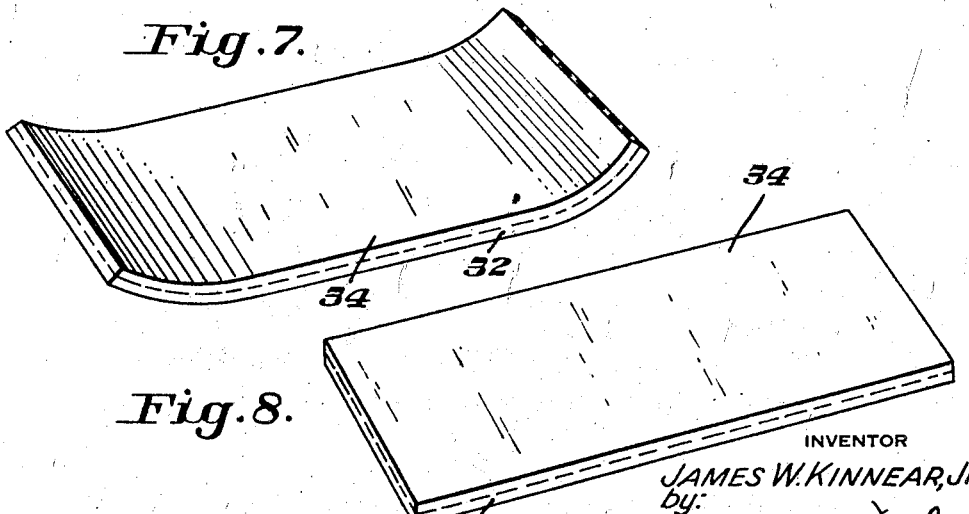
INVENTOR
JAMES W. KINNEAR, JR.,
by: Donald G. Dalton
his Attorney.

Patented Mar. 23, 1948

2,438,405

UNITED STATES PATENT OFFICE 2,438,405

METHOD FOR MANUFACTURING BIMETALLIC BODIES

James W. Kinnear, Jr., Pittsburgh, Pa., assignor to Carnegie-Illinois Steel Corporation, a corporation of New Jersey Application May 14, 1946, Serial No. 669,573

13 Claims. (Cl. 29—189)

The present invention relates to a method of manufacturing flat bimetallic ferrous bodies and, particularly, bimetallic ferrous bodies possessing different hardenability characteristics in the component parts thereof.

It is well known to produce steel bodies composed of two layers which have different properties. Usually one of said layers was made hard, and another soft, since said combination has been found best for meeting severe service conditions, exemplified by armor plate. Three major ways of approach were utilized in connection therewith, namely, hardening the surface of soft base metal by cementation reactions, welding together flat steel bodies of different nature, and forming said bodies by casting one metal against a prefabricated portion of the other, said step being followed by conventional rolling.

All three aforementioned methods formerly occupied a prominent place in the industry, but are largely discarded at present in the light of important objectionable features inherent thereto. Cementation processes led to an excessively sharp concentration gradient of alloying elements at the surface, causing a tendency toward peeling of a saturated layer from the base, an excessive grain size, and leading to mechanical characteristics of the harder layer not fully capable of meeting the desired requirements. Welding processes are associated with a continually present danger of an imperfect union, particularly when larger surfaces are concerned, and with an excessive cost in case of deposition with an electric arc or similar means. Casting molten steel against a smooth surface of the coating metal usually entails mechanical difficulties and frequently fails to produce fusion of said coating metal conducive to an adequate bond therebetween.

One object of the present invention is to provide a method for making bimetallic ferrous bodies substantially free from the objectionable features of the prior art, as noted above.

A further object of the invention is to provide a method for making two-layer ferrous bodies, said layers having a different response to thermal treatment.

Further objects of this invention will become apparent as the description proceeds and the features of novelty will be pointed out with particularity in the appended claims.

Present industrial experience demonstrates conclusively that compound ferrous bodies made by uniting different steels by welding are an improved product from the standpoint of the response thereof to thermal treatment, while permitting substantially any desired ratio between thickness of the component layers thereof. This feature is retained in the present invention which comprises a series of closely related steps ultimately leading to a superior finished product.

The uniting of two ferrous parts into a single body, forming a part of the present invention, embraces said welding feature, but enhances said feature by effectively roughening the surface used as a base for welding and by comprehensively eliminating any oxidation of surfaces undergoing the joining by welding, both steps being conducive to highly efficient welds. Said steps are achieved herein by selecting steel which has the composition intended for one of the ultimate layers of the finished body, introducing said steel, while molten, in a receptacle possessing heat absorbing capacity, allowing the steel to partially solidify around sides and bottom of said receptacle, but not at the top thereof, introducing into the molten core of the said partially solidified steel an element or elements required for bringing the composition of the steel still remaining in the molten state to the composition desired in the second layer of the ultimate bimetallic body, and cooling the cast body until solidification is completed.

Inward solidification occurring during the earlier stages of the operation results in the creation at the interface of solid and liquid metal contained in the aforementioned receptacle of a layer composed of projecting metallic dendrites which form a superior base for welded joints on account of the integrated keying effect produced by a plurality of dendrites closely spaced together. Full advantage of said keying effect is taken in the present invention by maintaining said dendritic surface in contact with completely liquefied steel during the welding operation proper, thus avoiding the objectionable effect of juxtaposition of semi-liquid metal and the roughened surface of the base, characteristic of conventional welding practice.

The alloying of the base metal while a portion thereof is still liquid and in contact with already solidified skin results in welded joints between two steels of dissimilar composition which are free from substantially all traces of surface oxidation and possess an exceptionally strong bond caused by cumulative effect of mechanical keying and fusion. Oxidation of the joint is fully eliminated since at no time is the dendritic surface exposed to air, and improved welding conditions are assured by the very process used, wherein the steel in contact with the dendritic base remains at all times in a fully liquid state, leading to an adequate penetration into interdendritic spaces required for an improved bond.

The selection of additions required in accordance with the present process is determined by the results sought. Since the compound bodies produced by the process of the present invention are intended, in general, for undergoing appropriate heat treating operations prior to placing them in use, the selection of addition substances is governed by the choice of properties to be possessed by the outer and inner layer of the finished body.

Well known hardness-penetration limitations frequently make impossible the hardening of bodies having heavy cross-sections. A given composition of basic steel assures a certain depth of hardening, but a uniformly hardened compound body of greater thickness than permitted by said composition is required. The hardenability of steel forming the backing for the outside layer having the original composition needs to be increased. This increase is effected by alloying with elements increasing hardness penetration in percentages leading to uniform hardening of the backing which takes place when the outside layer is quenched. Proper selection of said elements is circumscribed by well known teachings of hardenability, and is not claimed in the present invention.

A reverse situation is often the case when a soft tightly-adhering backing of hardened surface is sought in the final product. In this instance, the building up of a concentration of alloying elements through proper additions as recited hereinbefore, is replaced by adding to still liquid steel, substances ultimately lowering the original concentration of active hardening elements in steel. This lowering of the original concentration may be accomplished by either of two preferred methods, although still other procedures may be employed. Thus, the molten steel can be diluted with a liquid steel containing a predetermined and lower concentration of an element or elements which require reduction in the core of the ingot, or the liquid core can be treated with elements or compounds suitable for achieving the desired lowering of hardenability. Such additions suitable for the desired reduction of hardening elements concentration include oxygen, oxygen-bearing compounds, preferably metallic oxides, and elements capable of combining with hardening constituents of steel with the formation of phases not participating in allotropic transformations of the metal. Oxygen and oxygen-bearing substances oxidize hardening elements in preference to iron and lead to the partial elimination thereof in supernatant slag. Titanium, columbium and sulphur, illustrative of the elements constituting the last group of aforementioned additions, combine respectively with carbon and with manganese as $Ti_2C$, $Cb_2C$ and MnS, which are substantially insoluble in steel at the temperatures employed, and reduce thereby the percentage of hardenability-promoting carbon and manganese in the metal.

Cast bodies obtained by my invention, after the solidification of treated steel comprise a ferrous core surrounded by a steel case intimately bound thereto and having a composition different from that of the core. In order to make plate composed of two layers of metal, as distinct from three layers of conventional clad steels, the next processing step of the present invention consists in piercing and expanding on a mandrel, or otherwise, the properly heated cast body produced as described above. This piercing eliminates the central shrinkage cavity and prepares the casting for the next processing step which consists in splitting the pierced and expanded casting along the longitudinal axis thereof. It has been found that oxygen cutting and mechanical cutting appear to be preferable among other means that are satisfactory in carrying out the splitting operation.

The pierced, split, and expanded castings are then opened outwardly for flattening by conventional means, and heavy composite plates thus obtained are reduced to the desired thickness by mechanical means, preferably by rolling. Rolled bimetallic bodies are then finished in a conventional manner, shaped as desired, and heat treated in a way leading to the development of the desired physical characteristics therein.

In one method for carrying out the present invention, molten steel having a composition intended for one of the layers of the finished plate and made by conventional methods in an open hearth furnace or any other suitable device, preferably following the killed steel practice, is teemed into ingot molds of suitable dimensions and provided with hot tops in the usual manner. It has been found that a somewhat more uniform thickness of the originally outside layer is produced when the walls of the mold have uniform thickness, round molds leading to most favorable results. Steel is allowed to rise during teeming to the level of the junction between the ingot mold and the hot top; teeming is terminated; the metal is allowed to solidify for a time dictated by the intended thickness ratio of the two layers. For a substantially equal thickness thereof, the solidification time in a conventional ingot mold 77 inches in diameter and 130 inches high should closely approach two hours. Maintaining the metal in the hot top liquid while the body thereof in the ingot mold undergoes partial solidification is an important feature of the invention. Suitable hot top covers or other means for slowing heat radiation from the surface of metal were found to be sufficient for adequate insulation.

On termination of partial solidification time, the hot top of the ingots is filled with a steel having a desired alloy content, the said alloy content being diluted by the volume of still liquid steel in the core of the ingot and combining with constituents thereof resulting in the intended composition of the second layer of the finished body.

After filling the hot top, the ingots are allowed to cool down until fully solidified, and the temperature thereof is brought within the proper forging range and equalized by heating. Properly heated ingots are rounded on the outside under a press or hammer and the hot top portion of the ingot removed at the point of junction with the body of the ingot with an oxygen cutting torch or by mechanized means to facilitate piercing. The piercing operation, conducted at a proper temperature, for example 2000° F. for medium carbon steels, is accomplished under a press, hammer, or by other conventional piercing methods. The pierced ingots then are expanded after a proper preheating by press forging on a mandrel, in a rotary pipe rolling mill, or in plug rolling mills. The wall of the expanded tube is split parallel to the axis thereof with an oxygen cutting torch or by mechanical means. The resulting slit cylinders thus produced are opened outwardly, brought to a substantially planar shape, and the compound steel plate eventuating therefrom is forged or rolled in a mill to the desired dimensions.

The finished compound plate is formed to the desired ultimate shape either by hot working or by means of methods involving cold deformation; in the latter case, softening hot rolled stock by proper heat treatment can be used to advantage. The formed bodies then are heat treated, preferably hardened and tempered, to the final desired properties of both component layers. The operation can take place prior or following the machining step.

The invention will be understood more readily by reference to the accompanying drawings, in which:

Figure 1 is a sectional elevation of a composite ingot produced in accordance with the process of the present invention, the view showing the ingot in a hot topped mold with the hot top still in position, and indicating stages of filling of the mold and solidification of the composite ingot in the mold;

Figure 2 is an elevation of the ingot of Figure 1, after removal from the mold;

Figure 3 is a transverse section through the composite ingot of Figure 2, the view being taken on the line III—III of Figure 2;

Figure 4 is a view similar to Figure 3, but showing the composite ingot after piercing;

Figure 5 is a view similar to Figure 4, but indicating expansion of the pierced ingot;

Figure 6 is a perspective view of the pierced and expanded composite ingot after the sink head has been cropped off, the view indicating a manner of cutting or slitting the ingot preparatory to opening thereof;

Figure 7 is a perspective view of the opened composite ingot; and

Figure 8 is a perspective view of a composite flattened slab or plate obtained by flattening the opened shape of Figure 7.

Referring more particularly to the drawings, reference numeral 10 designates an ingot mold stool, the ingot mold proper being indicated at 12. The mold 12 is shown as being provided with a hot top 14 which is fitted on top of the mold 12. Molten steel of the desired composition is poured into the mold until it rises to approximately level with the line A—B in the lower portion of the hot top 14. A shell of this steel solidifies adjacent to the stool 10 and the mold 12, the interior or core portions of the steel remaining molten. The dotted line 16 of Figure 1 shows an indication of the interface between the solid and liquid portions of the steel. The alloying or modifying composition then is added to the molten core portion by teeming from a ladle held sufficiently high above the hot top so that the modifying or alloying constituents become uniformly commingled with the molten core portion of the ingot by the resulting agitation or dynamic stirring of the said molten portion of the ingot. The modifying or alloying constituents are added until the level of molten metal reaches substantially to the top of the hot top 14, an outer layer 17 of these alloying constituents first being solidified.

The mold 12 preferably is round in horizontal cross section so that the resulting ingot accordingly is round in horizontal cross section. If a non-round mold is employed, the resulting corners of the ingot preferably are rounded after the ingot is removed from the mold.

After the addition of the modifying or alloying constituents, the ingot is allowed to solidify sufficiently to remove it from the mold, solidification finally being effected all the way through. There is thus produced a composite ingot having a sink head 18, which is to be cropped off, the ingot being composed of an enveloping layer 20 of the steel of the original composition, and an inner, or core portion 22 of modified or alloyed composition. The sink head 18 is cropped off, and the remaining composite cylindrical portion of the ingot is pierced by conventional piercing instrumentalities, the resulting hole through the ingot being indicated at 24.

The pierced ingot then is expanded on suitable expanding mandrels until it is expanded somewhat as is indicated in Figure 5. The resulting structure is composed of two concentric, integrally bonded rings, the outer ring 26 being the original steel and the inner ring 28 being the modified or alloyed steel.

The resulting expanded, hollow body is slit lengthwise as indicated at 30 on Figure 6, and then pulled open as indicated in Figure 7, the original steel composition, indicated at 32 forming the backing for the alloyed steel 34. The opened shape of Figure 7 is suitably flattened into a plate or slab, as shown in Figure 8.

The method described above and claimed hereinafter permits controlling the relative thickness of the layers composing the finished body within wide limits without changing the equipment and the practice used, since variations in time allowed the original metal to remain in the casting container prior to the addition of core modifying substances offer convenient and positive means for adjusting the thickness of the solidified case, and, therefore, the ratio thereof to liquid core. This practice removes substantially all the limitations as to thickness of layers used, favorably distinguishing the present process from processes dependent on cementation reactions. More gradual and sounder bonding between the two metals because of the dendritic base, and the higher temperatures and longer time used during the actual welding operation than are possible with conventional processes, offer advantages not to be found in the welding processes of the types known to the prior art. The steel making practice, as related to the process proposed, does not require any special equipment or radical modifications in methods conventionally employed in steel plants. The mechanical steps of processing the ingot can be readily met by the machinery of tube mills and rolling mills with but slight changes. The finished compound plate produced following the teachings of the present invention is superior to any plate of the type described known to the prior art.

I claim:

1. The method for making composite steel bodies, which comprises partially solidifying a body of molten steel while retaining an inner portion thereof liquid, alloying the liquid portion of said body by adding alloying metal thereto of predetermined composition, solidifying said liquid alloyed portion, providing an axial opening in said solidified body, enlarging the radial dimensions of said opening, longitudinally severing the wall of the body, imparting a substantially planar shape to said body, and hot deforming the resulting composite body to the desired dimensions.

2. The method for making composite steel bodies, which comprises casting molten steel in a mold, partially solidifying said molten steel while retaining the inner portion thereof molten, adding to the resulting molten core of the casting alloying elements of predetermined composition, completely solidifying the resulting casting, including the core, axially piercing the said solidified casting, expanding the pierced casting, longitudinally cutting the wall of said expanded casting, opening outwardly said cut casting, flattening said opened casting, and hot deforming said flattened composite casting to the desired dimensions.

3. The method for making composite steel bodies which comprises casting molten steel in metallic ingot molds, peripherally solidifying said molten steel adjacent to the mold while leaving a molten central portion or core, adding to the liquid core of the ingots hardenability-affecting alloying elements in molten state, completely solidifying said ingots, rounding the said composite ingots, axially piercing said rounded ingots, expanding said pierced ingots, longitudinally slitting the wall of said expanded ingots, opening outwardly the resulting slit ingots, flattening said opened ingots, and hot deforming said flattened composite ingots.

4. In the method of claim 3 the step of using metallic molds which have solid angles greater than ninety degrees.

5. In the method of claim 3, the step of using round metallic molds.

6. In the method of claim 3, the step of using metallic molds in combination with sink heads.

7. In the method of claim 3, the step of regulating relative thickness of component layers by controlling the time of partial solidification.

8. In the method of claim 3, the step of adding to the liquid core of ingots molten hardenability-increasing alloying elements.

9. In the method of claim 3, the step of adding to the liquid core of ingots molten hardenability-reducing alloying elements.

10. In the method of claim 3, the step of adding to the liquid core of ingots molten hardenability-affecting alloying elements of the group comprising titanium, columbium and sulphur.

11. In the method of claim 3, the step of adding to the liquid core of ingots oxygen bearing compounds.

12. In the method of claim 3, the step of adding to the liquid core of ingots molten hardenability-affecting alloying elements through the medium of molten steel.

13. The method of making composite steel bodies, which comprises providing an ingot mold with a hot top, pouring into the mold molten steel of predetermined composition until the steel rises into the hot top, effecting peripheral solidification of portions of the steel adjacent to the mold to form a solidified envelope while maintaining interior or core portions of the steel molten, adding to the molten portions predetermined amounts of molten alloying constituents of predetermined composition until the molten core portions reach a predetermined composition different from that of the solidified envelope, allowing the resulting composite ingot to solidify completely, and fabricating a final composite slab from the ingot by piercing the composite ingot, then expanding the pierced ingot, slitting the expanded composite ingot lengthwise, opening the resulting slit composite ingot, and flattening the resulting opened shape into a slab.

JAMES W. KINNEAR, Jr.

REFERENCES CITED

The following references are of record in the file of this patent:

UNITED STATES PATENTS

| Number | Name | Date |
| --- | --- | --- |
| 2,010,650 | Stone | Aug. 6, 1935 |
| 2,236,504 | Herty | Apr. 1, 1941 |

OTHER REFERENCES

Metals Hdbk. 1939 edit. Amer. Society for Metals, Cleveland, Ohio.